US012365431B2

(12) United States Patent
Strunk

(10) Patent No.: US 12,365,431 B2
(45) Date of Patent: Jul. 22, 2025

(54) UNDERWATER VEHICLE CONTROL SYSTEM

(71) Applicant: ONESUBSEA IP UK LIMITED, London (GB)

(72) Inventor: Gavin P. Strunk, Brookline, MA (US)

(73) Assignee: ONESUBSEA IP UK LIMITED, London (GB)

( * ) Notice: Subject to any disclaimer, the term of this patent is extended or adjusted under 35 U.S.C. 154(b) by 547 days.

(21) Appl. No.: 17/754,620

(22) PCT Filed: Oct. 7, 2020

(86) PCT No.: PCT/US2020/054490
§ 371 (c)(1),
(2) Date: Apr. 7, 2022

(87) PCT Pub. No.: WO2021/071882
PCT Pub. Date: Apr. 15, 2021

(65) Prior Publication Data
US 2022/0363357 A1    Nov. 17, 2022

Related U.S. Application Data

(60) Provisional application No. 62/911,457, filed on Oct. 7, 2019.

(51) Int. Cl.
*B63G 8/00*     (2006.01)
*B63G 8/38*     (2006.01)

(52) U.S. Cl.
CPC .............. *B63G 8/001* (2013.01); *B63G 8/38* (2013.01); *B63G 2008/005* (2013.01)

(58) Field of Classification Search
CPC .... B63G 8/001; B63G 8/38; B63G 2008/005; G05D 1/0044; G06F 3/04815; G06T 19/00
See application file for complete search history.

(56) References Cited

U.S. PATENT DOCUMENTS 8,098,545 B2 *  1/2012  Rhodes .................. F42B 19/10
                                                    367/133
8,437,885 B1    5/2013  Beazley et al.
(Continued)

FOREIGN PATENT DOCUMENTS

AU    2014247986 A2 * 10/2015 ............... B63B 1/00
KR    10-1290083 B1    7/2013
(Continued)

OTHER PUBLICATIONS

International Preliminary Report on Patentability of International Patent Application No. PCT/US2020/054490 dated Apr. 21, 2022, 9 pages.
(Continued)

*Primary Examiner* — Anthony D Wiest
(74) *Attorney, Agent, or Firm* — Jeffrey D. Frantz

(57) ABSTRACT

An underwater vehicle control system includes at least one controller configured to receive a control input signal indicative of a target virtual position and/or a target virtual orientation of a target virtual underwater vehicle within a virtual environment. The at least one controller is also configured to output a target virtual underwater vehicle signal to a display indicative of instructions to display a visual representation of the target virtual underwater vehicle at the target virtual position and/or the target virtual orientation within the virtual environment. Furthermore, the at least one controller is configured to output a target physical underwater vehicle signal to an underwater vehicle within a physical environment indicative of instructions to move the underwater vehicle to a target physical position and/or a target physical orientation within the physical environment corresponding to the target virtual position and/or the target virtual orientation of the target virtual underwater vehicle.

9 Claims, 3 Drawing Sheets

(56) References Cited

U.S. PATENT DOCUMENTS

| | | |
|---|---|---|
| 2009/0276105 A1 | 11/2009 | Lacaze et al. |
| 2010/0185348 A1 | 7/2010 | Webb |
| 2016/0378107 A1 | 12/2016 | Morin et al. |
| 2018/0107210 A1 | 4/2018 | Harnett et al. |

FOREIGN PATENT DOCUMENTS

| | | |
|---|---|---|
| KR | 10-2018-0112227 A | 10/2018 |
| WO | 2013068821 A2 | 5/2013 |

OTHER PUBLICATIONS

Extended Search Report issued in European Patent Application No. 20873732.0 dated Oct. 5, 2023, 9 pages.

Search Report and Written Opinion of International Patent Application No. PCT/US2020/054490 on Jan. 20, 2021, 12 pages.

* cited by examiner

UNDERWATER VEHICLE CONTROL SYSTEM

CROSS-REFERENCE TO RELATED APPLICATION

This application is a national stage entry under 35 U.S.C. 371 of International Application No. PCT/US2020/054490, entitled "Underwater Vehicle Control System" filed Oct. 7, 2020, which claims priority to and the benefit of U.S. Provisional Application No. 62/911,457, entitled "Underwater Vehicle Control System" filed Oct. 7, 2019. This application is hereby incorporated by reference in its entirety for all purposes.

BACKGROUND

The present disclosure relates to an underwater vehicle control system.

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. For example, in subsea operations, hydrocarbon fluids such as oil and natural gas are obtained from a subterranean geologic formation, referred to as a reservoir, by drilling a well that penetrates the hydrocarbon-bearing geologic formation. The drilling and production systems generally include a wellhead, pumps, underwater conduits, and other equipment that enable drilling and extraction operations.

The costs associated with drilling, installing, and extracting these natural resources may be significant. Accordingly, operators may monitor the operation of the drilling and production systems to determine whether the systems are operating effectively and/or complying with regulations. However, utilizing fixed sensors with cable connections to a remote monitoring system to monitor the operation of the drilling and production systems may be undesirable due to the harsh sea environment and the size of the equipment used in the drilling and production systems. Accordingly, operators may use underwater vehicles to monitor these systems and equipment. For example, an underwater vehicle may be controlled by a surface vessel (e.g., ship, boat, platform, etc.) via acoustic signals transmitted through the water from the surface vessel to the underwater vehicle. In addition, the underwater vehicle may output sensor data to the surface vessel via acoustic signals transmitted through the water. Unfortunately, due to the large latency associated with transmission of acoustic signals through the water, the underwater vehicle may be difficult to control from the surface vessel.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Figure 1:
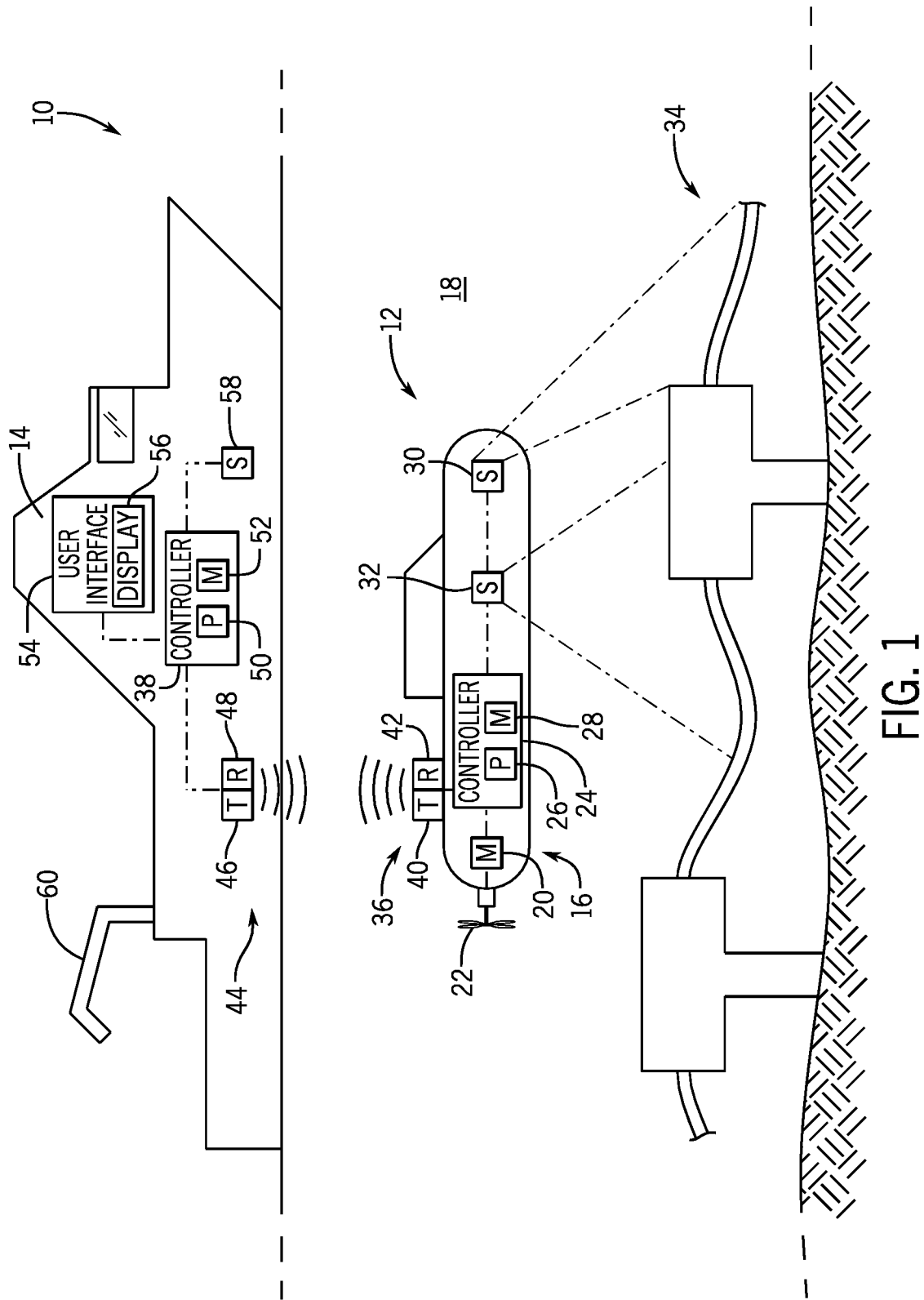
FIG. 1 is a schematic diagram of an embodiment of an underwater vehicle control system that may be used to control an underwater vehicle.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

As explained above, the costs associated with subsea drilling and extraction operations may be significant. Accordingly, the subsea drilling and extraction operations may be monitored to determine whether equipment is operating effectively and/or complying with regulations. However, utilizing fixed sensors with cable connections to a remote monitoring system to monitor the subsea drilling and extraction systems and equipment may be undesirable due to the harsh sea environment and the size of the systems/equipment used in the subsea drilling and extraction operations. Accordingly, underwater vehicles may be used to monitor the condition and operation of various subsea systems and equipment. Certain underwater vehicles may communicate with a surface vessel via acoustic signals transmitted through the water. For example, the surface vessel may control operation of the underwater vehicle via the acoustic signals, and the underwater vehicle may output sensor data to the surface vessel via the acoustic signals. Unfortunately, due to the large latency associated with transmission of acoustic signals through the water, the underwater vehicle may be difficult to control from the surface vessel. For example, there may be a significant time delay between instructions sent from the operator in the surface vessel and the corresponding response of the underwater vehicle. The time delay creates challenges for operating the underwater vehicle, as the operator may provide instructions faster than the underwater vehicle can receive and respond to the instructions.

In certain embodiments, an underwater vehicle control system may be used to control the underwater vehicle. The underwater vehicle control system includes a controller having a memory and a processor, and the controller is configured to generate a virtual environment representative of a physical environment in which the underwater vehicle is positioned. In addition, the controller is configured to output a virtual environment signal to a display of a user interface indicative of instructions to display a visual representation of the virtual environment. The controller is also configured to receive a control input signal (e.g., from the user interface) indicative of a target virtual position and/or a target virtual orientation of a target virtual underwater vehicle within the virtual environment. Furthermore, the controller is configured to output a target virtual underwater vehicle signal to the display of the user interface indicative of instructions to display a visual representation of the target virtual underwater vehicle at the target virtual position and/or the target virtual orientation within the virtual environment. The controller is also configured to output a target physical underwater vehicle signal to the underwater vehicle (e.g., to the controller of the underwater vehicle) within the physical environment indicative of instructions to move the underwater vehicle to a target physical position and/or a target physical orientation within the physical environment corresponding to the target virtual position and/or the target virtual orientation within the virtual environment. In response to receiving the target physical underwater vehicle signal, the controller of the underwater vehicle may control a propulsion system of the underwater vehicle to move the underwater vehicle to the target physical position and/or the target physical orientation. Due to the low latency associated with controlling the target virtual underwater vehicle within the virtual environment, control of the underwater vehicle may be facilitated (e.g., as compared to directly controlling the underwater vehicle using a high latency system).

FIG. 1 is a schematic diagram of an embodiment of an underwater vehicle control system 10 that may be used to control an underwater vehicle 12 (e.g., from a surface vessel 14). In the illustrated embodiment, the underwater vehicle 12 includes a propulsion system 16 configured to control movement of the underwater vehicle 12 through water 18. As illustrated, the propulsion system 16 includes a motor 20 and a propeller 22. The motor 20 is configured to drive the propeller 22, thereby driving the underwater vehicle 12 through the water 18. The motor 20 may include an electric motor, a pneumatic motor, a hydraulic motor, any other suitable type(s) of motor(s), or a combination thereof. In addition, while the illustrated propulsion system 16 includes a single motor 20 and a single propeller 22 in the illustrated embodiment, in other embodiments, the propulsion system may include any suitable number of motors (e.g., 0, 1, 2, 3, 4, 5, 6, etc.) and/or propellers (e.g., 0, 1, 2, 3, 4, 5, 6, etc.). For example, in certain embodiments, the motor and/or the propeller may be omitted, and the propulsion system may include another suitable device/assembly configured to control movement of the underwater vehicle through the water. Furthermore, in certain embodiments, the propulsion system may control the orientation of the propeller, the orientation of one or more controllable fins, operation of one or more other propellers, or a combination thereof, to control the direction of movement of the underwater vehicle through the water.

Furthermore, in the illustrated embodiment, the underwater vehicle 12 includes a controller 24 communicatively coupled to the propulsion system 16. In certain embodiments, the controller 24 is an electronic controller having electrical circuitry configured to control the propulsion system 16 to move the underwater vehicle 12 through the water 18. In the illustrated embodiment, the controller 24 includes a processor, such as the illustrated microprocessor 26, and a memory device 28. The controller 24 may also include one or more storage devices and/or other suitable components. The processor 26 may be used to execute software, such as software for controlling the propulsion system, and so forth. Moreover, the processor 26 may include multiple microprocessors, one or more "general-purpose" microprocessors, one or more special-purpose microprocessors, and/or one or more application specific integrated circuits (ASICS), or some combination thereof. For example, the processor 26 may include one or more reduced instruction set (RISC) processors.

The memory device 28 may include a volatile memory, such as random access memory (RAM), and/or a nonvolatile memory, such as read-only memory (ROM). The memory device 28 may store a variety of information and may be used for various purposes. For example, the memory device 28 may store processor-executable instructions (e.g., firmware or software) for the processor 26 to execute, such as instructions for controlling the propulsion system, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the propulsion system, etc.), and any other suitable data.

In the illustrated embodiment, the underwater vehicle 12 includes a camera 30 and a light detection and ranging (LIDAR) system 32 communicatively coupled to the controller 24. The camera 30 is configured to output a physical image signal indicative of an image of the physical environment. As illustrated, the camera 30 is directed toward a subsea structure 34, such as production pipe(s), subsea wellhead(s), riser(s), pumping equipment, other suitable subsea structure(s) and/or undersea equipment, or a combination thereof. Accordingly, the camera is configured to output a physical image signal indicative of an image of the subsea structure 34 within the physical environment. However, the camera may also be directed to other elements within the physical environment, such as the seafloor, the surface vessel, another underwater or surface vehicle, another suitable element, or a combination thereof. In certain embodiments, the underwater vehicle includes an actuator coupled to the camera and communicatively coupled to the controller. In such embodiments, the controller may control the actuator to direct the camera to any suitable portion of the physical environment.

In addition, the LIDAR system 32 is configured to scan the physical environment (e.g., the subsea structure, the surface vessel, the seafloor, etc.) with one or more lasers and to output a LIDAR signal (e.g., physical image signal) indicative of a three-dimensional model of a portion of the physical environment. For example, the LIDAR signal may be indicative of a point cloud of points on the surface of the subsea structure 34. The controller 24 may generate a three-dimensional model of the subsea structure based on the LIDAR signal. In addition, the LIDAR system and/or the camera may enable mapping of the seafloor and/or other underwater equipment, searching for various undersea structures, and navigation of the underwater vehicle (e.g., by identifying objects in the path of the underwater vehicle, etc.), among other functions. While the underwater vehicle 12 includes a single camera 30 and a single LIDAR system 32 in the illustrated embodiment, in other embodiments, the underwater vehicle may include more or fewer cameras (e.g., 0, 1, 2, 3, 4, 5, 6, or more) and/or more or fewer LIDAR systems (e.g., 0, 1, 2, 3, 4, 5, 6, or more). Furthermore, in certain embodiments, the underwater vehicle may include other and/or additional sensor(s) communicatively coupled to the controller (e.g., temperature sensor(s), pressure sensor(s), magnetic sensor(s), ultrasonic sensor(s), acoustic sensor(s), etc.).

In the illustrated embodiment, the underwater vehicle 12 includes a communication system 36 communicatively coupled to the controller 24. The communication system 36 is configured to establish communication between the controller 24 and the controller of another suitable system, such as the controller 38 (e.g., remote controller) of the surface vessel 14. The communication system 36 includes one or more transmitters 40 configured to output communication signal(s) and one or more receivers 42 configured to receive communication signal(s). However, in other embodiments, the communication system may include one or more transceivers configured to both output and receive communication signal(s). In the illustrated embodiment, the transmitter(s) 40 are configured to output acoustic communication signal(s) through the water 18, and the receiver(s) 42 are configured to receive acoustic communication signal(s) via the water 18. For example, the communication system 36 may include one or more acoustic modems. While the communication system 36 is configured to communicate via acoustic communication signal(s) in the illustrated embodiment, in other embodiments, the communication system may be configured to communicate via any other suitable communication signal(s), such as wireless radio frequency communication signal(s), wired radio frequency communication signal(s), optical communication signal(s) (e.g., via fiber optic cable(s)), or any other suitable communication signal(s) or combination of suitable communication signal(s).

In the illustrated embodiment, the controller 24 of the underwater vehicle 12 is configured to communicate with the controller 38 of the surface vessel 14 (e.g., boat, ship, platform, etc.) via the communication system 36 of the underwater vehicle 12 and a corresponding communication system 44 of the surface vessel 14. The communication system 44 of the surface vessel 14 includes one or more transmitters 46 configured to output communication signal(s) and one or more receivers 48 configured to receive communication signal(s). However, in other embodiments, the communication system may include one or more transceivers configured to both output and receive communication signal(s). In the illustrated embodiment, the transmitter(s) 46 are configured to output acoustic communication signal(s) through the water 18, and the receiver(s) 48 are configured to receive acoustic communication signal(s) via the water 18. For example, the communication system 44 may include one or more acoustic modems. While the communication system 44 is configured to communicate via acoustic communication signal(s) in the illustrated embodiment, in other embodiments, the communication system may be configured to communicate via any other suitable communication signal(s), such as wireless radio frequency communication signal(s), wired radio frequency communication signal(s), optical communication signal(s) (e.g., via fiber optic cable(s)), or any other suitable communication signal(s) or combination of suitable communication signal(s). Furthermore, while the communication systems of the underwater vehicle and the surface vessel are configured to communicate with one another in the illustrated embodiment, in other embodiments, at least one of the communication systems may be configured to communicate with other suitable communication system(s), such as the communication system of another surface vessel, the communication system of another underwater vehicle, the communication system of a remote control center, other suitable communication system(s), or a combination thereof.

As illustrated, the communication system 44 of the surface vessel 14 is communicatively coupled to the controller 38 of the surface vessel 14. Accordingly, the controller 38 of the surface vessel 14 may communicate with the controller 24 of the underwater vehicle 12 via the respective communication systems. In certain embodiments, the controller 38 of the surface vessel 14 is an electronic controller having electrical circuitry configured to provide instructions to the underwater vehicle controller 24 and/or to receive data from the underwater vehicle controller 24. In the illustrated embodiment, the controller 38 includes a processor, such as the illustrated microprocessor 50, and a memory device 52. The controller 38 may also include one or more storage devices and/or other suitable components. The processor 50 may be used to execute software, such as software for providing instructions to and/or receiving data from the underwater vehicle controller, and so forth. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for providing instructions to and/or receiving data from the underwater vehicle controller 24, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for providing instructions to and/or receiving data from the underwater vehicle controller 24, etc.), and any other suitable data.

In the illustrated embodiment, the surface vessel 14 includes a user interface 54 communicatively coupled to the controller 38. The user interface 54 may include one or more suitable controls configured to provide input to the surface vessel controller 38. In addition, the user interface 54 may include one or more suitable interfaces configured to present information to an operator of the surface vessel 14. For example, in the illustrated embodiment, the user interface 54 includes a display 56 configured to present visual information to the surface vessel operator. In addition, in certain embodiments, the display 56 may include a touch screen interface configured to receive input from the surface vessel operator. By way of example, the surface vessel operator may provide instructions to the underwater vehicle 12 (e.g., to control the position and/or orientation of the underwater vehicle, etc.) via the user interface 54, and the instructions may be output to the underwater vehicle controller 24 via the surface vessel controller 38, the surface vessel communication system 44, and the underwater vehicle communication system 36. In addition, in certain embodiments, the camera 30 and/or the LIDAR system 32 may output data (e.g., LIDAR data, image data, etc.) to the surface vessel controller 38 via the underwater vehicle controller 24, the underwater vehicle communication system 36, and the surface vessel communication system 44. Furthermore, in certain embodiments, the underwater vehicle controller may receive instructions from and/or output data to any other suitable controller (e.g., of a remote facility, etc.).

In the illustrated embodiment, the surface vessel 14 includes a sensor 58 communicatively coupled to the controller 38. The sensor 58 may include any suitable device or combination of devices configured to monitor the position and/or the orientation of the underwater vehicle 12. For example, in certain embodiments, the sensor 58 may include an active sonar sensor configured to use acoustic waves to facilitate determination of the position and/or the orientation of the underwater vehicle 12. Furthermore, in certain embodiments, the sensor 58 may include a LIDAR system configured to use light beam(s) to facilitate determination of the position and/or the orientation of the underwater vehicle 12. In addition, in certain embodiments, the surface vessel 14 may include other and/or additional sensor(s) configured to monitor any suitable parameter(s) (e.g., water temperature sensor(s), water depth sensor(s), position sensor(s), etc.).

In the illustrated embodiment, the surface vessel 14 includes a crane 60 configured to enable deployment and retrieval of the underwater vehicle 12. For example, the surface vessel 14 may transport the underwater vehicle 12 to a deployment site and then deploy the underwater vehicle 12 via the crane 60. The deployment site may include a subsea structure 34 configured to transport and/or store hydrocarbons. For example, the deployment site may include a variety of oil and gas infrastructure, such as production pipe(s), subsea wellhead(s), riser(s), pumping equipment, other suitable subsea structure(s) and/or undersea equipment, or a combination thereof. At the deployment site, the underwater vehicle 12 may perform maintenance operations, inspection operations, mapping operations, research operations, other suitable operations, or a combination thereof. For example, in certain embodiments, the underwater vehicle 12 may use the camera 30 and/or the LIDAR system 32 to facilitate performance of certain operation(s).

In certain embodiments, the surface vessel controller 38 may generate a virtual environment representative of the physical environment in which the underwater vehicle 12 is positioned. The controller 38 may generate the virtual environment based on stored sensor data (e.g., from LIDAR sensor(s), from sonar sensor(s), from camera(s), etc.), model(s) of subsea structure(s) (e.g., computer-aided design (CAD) model(s), etc.), sensor data from the sensor 58 of the surface vessel 14, data from the underwater vehicle camera 30, data from the underwater vehicle LIDAR system 32, other suitable source(s) of data, or a combination thereof. For example, in certain embodiments, the controller 38 may generate an initial virtual environment based on stored sensor data and/or model(s) of the subsea structure(s), and then the controller 38 may generate the virtual environment by updating the initial virtual environment based on sensor data from the surface vessel and/or the underwater vehicle. Once the virtual environment is generated, the controller 38 may output a virtual environment signal to the display 56 of the user interface 54 indicative of instructions to display a visual representation of the virtual environment. In response to receiving the virtual environment signal, the display may present the visual representation of the virtual environment. In certain embodiments, the visual representation of the virtual environment includes a three-dimensional visual representation of the virtual environment including a three-dimensional visual representation of the seafloor, a three-dimensional visual representation of the subsea structure, a three-dimensional visual representation of other element(s) within the physical environment, or a combination thereof. While a three-dimensional visual representation of the virtual environment is disclosed herein, in certain embodiments, the visual representation of the virtual environment may be two-dimensional. Furthermore, in certain embodiments, the visual representation of the virtual environment may be stereoscopic (e.g., in embodiments in which the user interface includes a stereoscopic display).

In addition, the controller 38 may receive a control input signal indicative of a target virtual position and/or a target virtual orientation of a target virtual underwater vehicle within the virtual environment, and the controller may output a target virtual underwater vehicle signal to the display 56 of the user interface 54 indicative of instructions to display a visual representation of the target virtual underwater vehicle at the target virtual position and/or the target virtual orientation within the virtual environment. In response to receiving the target virtual underwater vehicle signal from the controller 38, the display may present the visual representation of the target virtual underwater vehicle at the target virtual position and/or the target virtual orientation within the virtual environment. In certain embodiments, the user interface 54 may be configured to output the control input signal based on input from the operator, and the controller 38 may receive the control signal input from the user interface 54. For example, the user interface may include a first hand controller configured to receive a position input from the operator, and the user interface may include a second hand controller configured to receive an orientation input from the operator. As the operator moves the first hand controller, the user interface 54 may output the control input signal to the controller 38 indicative of the target virtual position of the target virtual underwater vehicle, and the controller 38, in turn, may output the target virtual underwater vehicle signal to the display 56 of the user interface 54 indicative of instructions to display the visual representation of the target virtual underwater vehicle at the target virtual position. Accordingly, as the operator moves the first hand controller, the visual representation of the target virtual underwater vehicle may move in real-time or near real-time within the virtual environment. In addition, as the operator moves the second hand controller, the user interface 54 may output the control input signal to the controller 38 indicative of the target virtual orientation of the target virtual underwater vehicle, and the controller 38, in turn, may output the target virtual underwater vehicle signal to the display 56 of the user interface 54 indicative of instructions to display the visual representation of the target virtual underwater vehicle at the target virtual orientation. Accordingly, as the operator moves the second hand controller, the visual representation of the target virtual underwater vehicle may move in real-time or near real-time within the virtual environment. Using the first hand controller and the second hand controller, the operator may position the target virtual underwater vehicle at any suitable location within the virtual environment and angle the target virtual underwater vehicle at any suitable orientation.

While two hand controllers of the user interface are disclosed above, the user interface may include other and/or additional controls to control the target virtual position and/or the target virtual orientation of the target virtual underwater vehicle. For example, in certain embodiments, the user interface may include a single hand controller configured to control one of the target virtual position or the target virtual orientation of the target virtual underwater vehicle. Furthermore, in certain embodiments, the user interface may include a single hand controller configured to control both the target virtual position and the target virtual orientation of the target virtual underwater vehicle. In certain embodiments, a touch screen interface of the display, a keyboard, a mouse, one or more buttons, one or more hand controllers (e.g., one or more of the hand controllers disclosed above), other suitable control(s), or a combination thereof, may be used to control the target virtual position and/or the target virtual orientation of the target virtual underwater vehicle.

Furthermore, the controller 38 may output a target physical underwater vehicle signal to the underwater vehicle 12 (e.g., to the controller 24 of the underwater vehicle 12 via the respective communication systems) indicative of instructions to move the underwater vehicle 12 to a target physical position and/or a target physical orientation within the physical environment corresponding to the target virtual position and/or the target virtual orientation of the target virtual underwater vehicle within the virtual environment. For example, in certain embodiments, the controller 38 may automatically output the target physical underwater vehicle signal in response to receiving the control input signal from the user interface 54. In such embodiments, the controller 38 may output the target physical underwater vehicle signal multiple times in response to continued operator input. Furthermore, in certain embodiments, the user interface 54 may be configured to output an engagement signal in response to operator input (e.g., activation of an engagement control), and the controller may be configured to output the target physical underwater vehicle signal only in response to receiving the engagement signal. Accordingly, in such embodiments, the controller 38 may only output a single target physical underwater vehicle signal in response to the operator activating the engagement control, even if the operator provides multiple target virtual underwater vehicle control inputs to the user interface before activating the engagement control. The engagement control of the user interface 54 may include a button, a switch, a lever, a virtual button on the display, another suitable control, or a combination thereof.

In certain embodiments (e.g., embodiments including the engagement control), the operator may direct the target virtual underwater vehicle from a current virtual position and a current virtual orientation (e.g., corresponding to a current physical position and a current physical orientation of the underwater vehicle within the physical environment) to the target virtual position and the target virtual orientation using conventional controls for directly controlling the underwater vehicle. For example, the controller may utilize a simulation to simulate movement of the virtual underwater vehicle from the current virtual position and the current virtual orientation to the target virtual position and the target virtual orientation. The simulation may utilize the same guidance and/or control process executed by the underwater vehicle to enhance the accuracy of the movement/rotation of the target virtual underwater vehicle within the virtual environment. For example, the operator may utilize controls of the user interface to provide a speed input and a rotation rate input to the controller. The simulation executed by the controller may move/rotate the target virtual underwater vehicle through the virtual environment, and the controller may periodically output the target virtual underwater vehicle signal to the display to enable the operator to view the movement/rotation of the target virtual underwater vehicle. Once the target virtual underwater vehicle is in a desired position and/or orientation, the operator may activate the engagement control to cause the controller to output the target physical underwater vehicle signal.

The controller 24 of the underwater vehicle 12 is configured to receive the target physical underwater vehicle signal from the controller 38 of the surface vessel 14 via the respective communication systems. In response to receiving the target physical underwater vehicle signal, the underwater vehicle controller 24 is configured to output a control signal to the propulsion system 16 indicative of instructions to move the underwater vehicle from a current physical position and a current physical orientation to the target physical position and/or the target physical orientation. For example, the underwater vehicle controller 24 may compare the current physical position to the target physical position, and/or the underwater vehicle controller 24 may compare the current physical orientation to the target physical orientation. The underwater vehicle controller 24 may then establish a strategy for moving from the current physical position to the target physical position and/or for moving from the current physical orientation to the target physical orientation based on the comparison. Once the strategy is established, the underwater vehicle controller may output the control signal to the propulsion system based on the strategy. In certain embodiments, the strategy is determined based on a guidance and control process (e.g., in which the underwater vehicle controller 24 utilizes a simulation to determine the strategy based on physical properties of the underwater vehicle and expected performance of the propulsion system). In certain embodiments, the underwater vehicle controller 24 may only output the control signal if the difference between the current physical position and the target physical position is greater than a position threshold value (e.g., 5 meters, 3 meters, 100 cm, 50 cm, 25 cm, 10 cm, 5 cm, or 1 cm, etc.), and/or if the difference between the current physical orientation and the target physical orientation is greater than an orientation threshold value (e.g., 15 degrees, 10 degrees, 7 degrees, 5 degrees, 2 degrees, 1 degree, 0.5 degrees, 0.25 degrees, etc.). While the underwater vehicle controller 24 is configured to output the control signal to the propulsion system 16 in the illustrated embodiment, in other embodiments, another suitable controller (e.g., the surface vessel controller) may output the control signal.

The current physical position and/or the current physical orientation of the underwater vehicle 12 may be determined based on feedback from sensor(s) of the surface vessel 14, sensor(s) of the underwater vehicle, other suitable sensor(s), or a combination thereof. As previously discussed, the sensor 58 of the surface vessel 14 is configured to monitor the current physical position and/or the current physical orientation of the underwater vehicle 12 within the physical environment. Accordingly, in certain embodiments, the surface vessel controller 38 may determine the current physical position and/or the current physical orientation of the underwater vehicle 12 based on feedback from the sensor 58 and output a current physical underwater vehicle signal indicative of the current physical position and/or the current physical orientation of the underwater vehicle 12 to the underwater vehicle controller. Furthermore, in certain embodiments, the underwater vehicle controller 24 may determine the current physical position and/or the current physical orientation of the underwater vehicle 12 based on feedback from the camera 30, the LIDAR system 32, other suitable sensor(s) (e.g., one or more inertial measurement units (IMU), one or more accelerometers, one or more gyroscopes, one or more geomagnetic sensors, one or more position sensors, such as global positioning system (GPS) sensor(s), etc.), or a combination thereof. The underwater vehicle controller 24 may then output the current physical underwater vehicle signal indicative of the current physical position and/or the current physical orientation of the underwater vehicle 12 to the surface vessel controller 38. In certain embodiments, the underwater vehicle controller 24 may determine the current physical position and/or the current physical orientation of the underwater vehicle 12 based on feedback from the underwater vehicle sensor(s) (e.g., the camera 30, the LIDAR system 32, etc.) and feedback from the surface vessel sensor 58, which may be received via the surface vessel controller and the respective communication systems. Furthermore, in certain embodiments, the surface vessel controller 38 may determine the current physical position and/or the current physical orientation of the underwater vehicle 12 based on feedback from the surface vessel sensor 58 and feedback from the underwater vehicle sensor(s) (e.g., the camera 30, the LIDAR system 32, etc.), which may be received via the underwater vehicle controller and the respective communication systems. The surface vessel controller 38 may then output the current physical underwater vehicle signal indicative of the current physical position and/or the current physical orientation of the underwater vehicle 12 to the underwater vehicle controller via the respective communication systems.

Figure 2:
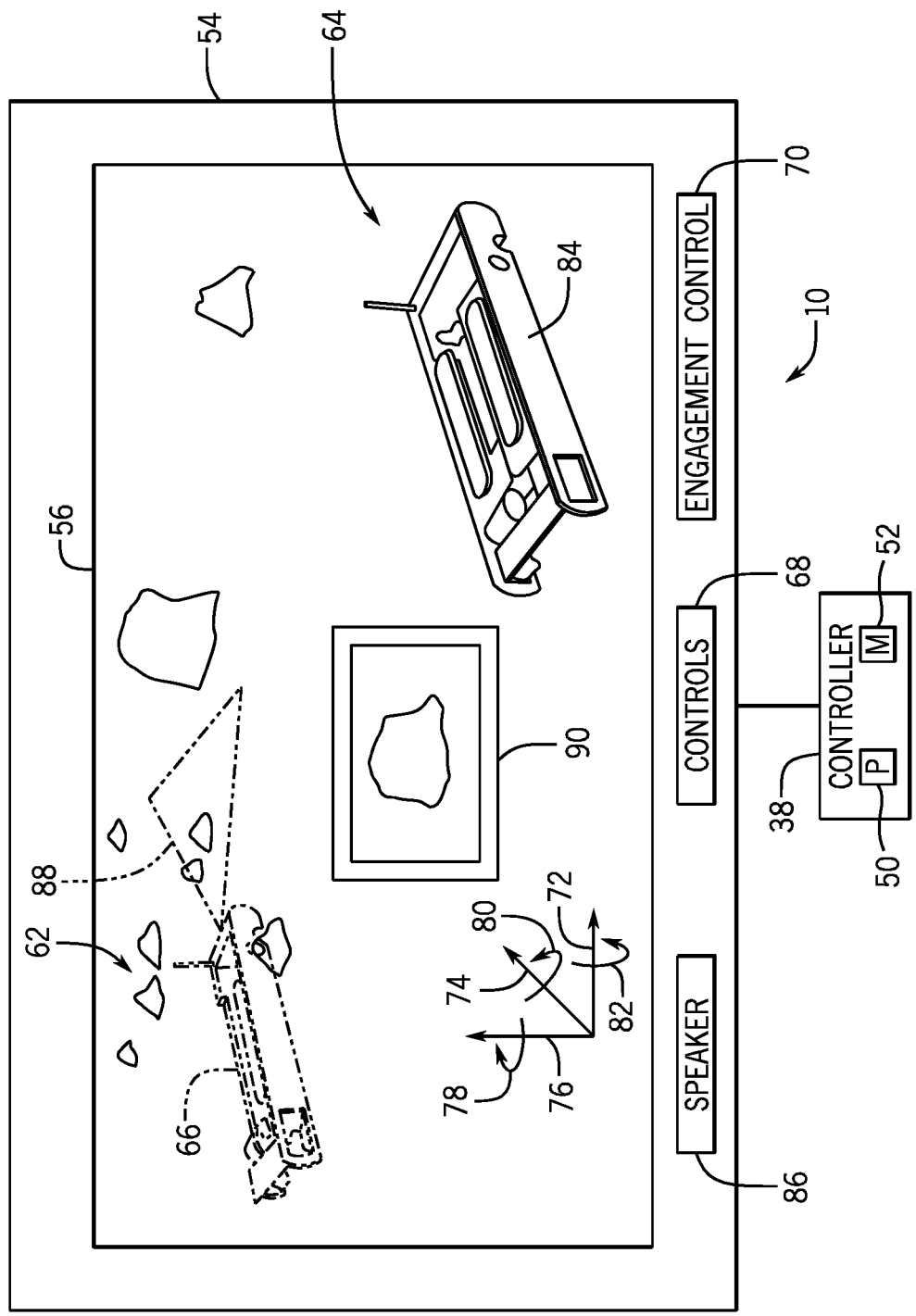
FIG. 2 is a schematic diagram of a controller and a user interface of the underwater vehicle control system of FIG. 1.

FIG. 2 is a schematic diagram of the controller 38 (e.g., surface vessel controller) and the user interface 54 (e.g., surface vessel user interface) of the underwater vehicle control system 10 of FIG. 1. As previously discussed, the controller 38 may generate a virtual environment representative of the physical environment in which the underwater vehicle is positioned. The controller 38 may then output a virtual environment signal to the display 56 of the user interface 54 indicative of instructions to display a visual representation 62 of the virtual environment. In response to receiving the virtual environment signal, the display 56 may present the visual representation 62 of the virtual environment. In the illustrated embodiment, the visual representation 62 of the virtual environment includes a three-dimensional visual representation 62 of the virtual environment including a three-dimensional visual representation 64 of the seafloor. In addition, the controller 38 may receive a control input signal indicative of a target virtual position and/or a target virtual orientation of a target virtual underwater vehicle within the virtual environment, and the controller may output a target virtual underwater vehicle signal to the display 56 of the user interface 54 indicative of instructions to display a visual representation 66 of the target virtual underwater vehicle at the target virtual position and/or the target virtual orientation within the virtual environment. In response to receiving the target virtual underwater vehicle signal from the controller 38, the display 56 may present the visual representation 66 of the target virtual underwater vehicle at the target virtual position and/or the target virtual orientation within the virtual environment. In certain embodiments, the user interface 54 may be configured to output the control input signal based on input from the operator, and the controller 38 may receive the control input signal from the user interface 54. For example, the user interface 54 may include controls 68 (e.g., including a keyboard, a mouse, one or more buttons, one or more hand controllers, other suitable control(s), or a combination thereof) configured to enable the operator to provide input to the user interface 54. Furthermore, in certain embodiments, the display 56 may include a touch screen interface configured to receive input from the operator.

In the illustrated embodiment, the virtual position (e.g., the target virtual position and the current virtual position) is represented within a rectangular coordinate system having a longitudinal axis 72, a lateral axis 74, and a vertical axis 76. The rectangular coordinate system is fixed relative to the virtual environment. While the virtual position is represented within a rectangular coordinate system in the illustrated embodiment, in other embodiments, the virtual position may be represented within a cylindrical coordinate system or a spherical coordinate system, among other suitable coordinate systems. Furthermore, in the illustrated embodiment, the virtual orientation (e.g., the target virtual orientation and the current virtual orientation) is represented as yaw 78 about the vertical axis 76, pitch 80 about the lateral axis 74, and roll 82 about the longitudinal axis 72. However, in other embodiments, the virtual orientation may be represented as a quaternion or any other suitable representation.

Furthermore, the controller 38 may output a target physical underwater vehicle signal to the underwater vehicle (e.g., to the controller of the underwater vehicle via the respective communication systems) indicative of instructions to move the underwater vehicle to a target physical position and/or a target physical orientation within the physical environment corresponding to the target virtual position and/or the target virtual orientation of the target virtual underwater vehicle within the virtual environment. For example, in certain embodiments, the controller 38 may automatically output the target physical underwater vehicle signal in response to receiving the control input signal from the user interface 54. In such embodiments, the controller 38 may output the target physical underwater vehicle signal multiple times in response to continued operator input. Furthermore, in certain embodiments, the user interface 54 may be configured to output an engagement signal in response to operator input (e.g., activation of an engagement control 70), and the controller may be configured to output the target physical underwater vehicle signal only in response to receiving the engagement signal. Accordingly, in such embodiments, the controller 38 may only output a single target physical underwater vehicle signal in response to the operator activating the engagement control, even if the operator provides multiple target virtual underwater vehicle control inputs to the user interface before activating the engagement control. The engagement control 70 of the user interface 54 may include a button, a switch, a lever, a virtual button on the display, another suitable control, or a combination thereof. The controller of the underwater vehicle is configured to receive the target physical underwater vehicle signal from the controller 38 via the respective communication systems. In response to receiving the target physical underwater vehicle signal, the underwater vehicle controller is configured to output a control signal to the propulsion system indicative of instructions to move the underwater vehicle from a current physical position and a current physical orientation to the target physical position and/or the target physical orientation. Due to the low latency associated with controlling the target virtual underwater vehicle within the virtual environment, control of the underwater vehicle may be facilitated (e.g., as compared to directly controlling the underwater vehicle using a high latency system).

In the illustrated embodiments, the controller 38 is configured to output a current virtual underwater vehicle signal to the display 56 of the user interface 54 indicative of instructions to display a visual representation 84 of a current virtual underwater vehicle at a current virtual position and/or a current virtual orientation within the virtual environment corresponding to the current physical position and/or the current physical orientation of the underwater vehicle within the physical environment. In response to receiving the current virtual underwater vehicle signal from the controller 38, the display 56 may display the visual representation 84 of the current virtual underwater vehicle at the current virtual position and/or the current virtual orientation with the virtual environment. Displaying the visual representation of the current virtual underwater vehicle at the current virtual position and/or the current virtual orientation enables the operator to view the progress of the underwater vehicle toward the target position/orientation. For example, the controller 38 may output the current virtual underwater vehicle signal at periodic intervals (e.g., based on a fixed timing, based on the sample rate of the sensor(s), etc.). In the illustrated embodiment, the controller 38 may instruct the display 56 of the user interface 54 to display the visual representation 66 of the target virtual underwater vehicle in phantom/dashed lines, and the controller 38 may instruct the display 56 of the user interface 54 to display the visual representation 84 of the current virtual underwater vehicle in solid lines. However, in other embodiments, the controller may instruct the display to display the visual representation of the target virtual underwater vehicle in any suitable line pattern and/or color, and the controller may instruct the display to display the visual representation of the current virtual underwater vehicle is any suitable line pattern and/or color (e.g., to differentiate the target virtual underwater vehicle from the current virtual underwater vehicle). While the controller 38 is configured to output the current virtual underwater vehicle signal to the display 56 of the user interface 54 in the illustrated embodiment, in other embodiments, the current virtual underwater vehicle signal may not be output to the display. In such embodiments, the display may not display the visual representation of the current virtual underwater vehicle.

Furthermore, in certain embodiments, the controller 38 may determine whether the current physical position of the underwater vehicle is substantially equal to the target physical position of the underwater vehicle, and/or the controller 38 may determine whether the current physical orientation of the underwater vehicle is substantially equal to the target physical orientation of the underwater vehicle. In response to the current physical position being substantially equal to the target physical position and/or the current physical orientation being substantially equal to the target physical orientation, the controller 38 may output a position match signal to the user interface 54 indicative of instructions to provide an indication that the current physical position is substantially equal to the target physical position and/or the current physical orientation is substantially equal to the target physical orientation. In response to receiving the position match signal, the user interface 54 may provide an indication that the current physical position is substantially equal to the target physical position and/or the current physical orientation is substantially equal to the target physical orientation. For example, the user interface 54 may emit an audible (e.g., via a speaker 86 of the user interface 54) and/or visual indication (e.g., via the display 56). For example, the controller 38 may instruct the target virtual underwater vehicle and/or the current virtual underwater vehicle (e.g., which are overlapping one another) to flash and/or change color to indicate that the current physical position is substantially equal to the target physical position and/or the current physical orientation is substantially equal to the target physical orientation. While the controller 38 is configured to output the position match signal in the illustrated embodiment, in other embodiments, the controller may not output the position match signal. As used herein "substantially equal" refers to a difference in position/orientation of less than a threshold value. For example, the threshold value for a position difference may be 5 meters, 3 meters, 100 cm, 50 cm, 25 cm, 10 cm, 5 cm, or 1 cm. In addition, the threshold value for an orientation difference may be 15 degrees, 10 degrees, 7 degrees, 5 degrees, 2 degrees, 1 degree, 0.5 degrees, or 0.25 degrees.

In the illustrated embodiment, the controller 38 is configured to determine a field of view of one or more sensors of the underwater vehicle relative to the target virtual underwater vehicle. For example, the controller 38 may determine a field of view of the LIDAR system and/or a field of view of the camera relative to the target virtual underwater vehicle. Once each field of view is determined, the controller 38 may output a target field of view signal to the display 56 indicative of instructions to display a visual representation 88 of each field of view relative to the target virtual underwater vehicle. In response to receiving the target field of view signal, the display 56 may display the visual representation 88 of each field of view. In the illustrated embodiment, the controller 38 determines a field of view of the camera, and the display 56 displays the visual representation 88 of the field of view of the camera relative to the target virtual underwater vehicle. Accordingly, the operator may control the target virtual position and/or the target virtual orientation of the target virtual underwater vehicle such that an object of interest is positioned within the field of view. While the controller is configured to output the target field of view signal in the illustrated embodiment, in other embodiments, the controller may not output the target field of view signal.

In the illustrated embodiment, the controller 38 is configured to generate a target virtual image 90 based on the target virtual position of the target virtual underwater vehicle, the target virtual orientation of the target virtual underwater vehicle, and the virtual environment. In addition, the controller 38 is configured to output a target virtual image signal to the display 56 of the user interface 54 indicative of instructions to display the target virtual image 90. In response to receiving the target virtual image signal, the display 56 may display the target virtual image 90. The target virtual image is indicative of an expected image of the virtual environment from a respective sensor while the target virtual underwater vehicle is in the target virtual position and the target virtual orientation. The respective sensor may include the LIDAR system, the camera, or another suitable sensor. The operator may control the target virtual position and/or the target virtual orientation of the target virtual underwater vehicle such that an object of interest is shown within the target virtual image. While the controller is configured to generate one target virtual image in the illustrated embodiment, in other embodiments, the controller may be configured to generate more or fewer target virtual images (e.g., 0, 1, 2, 3, 4, or more), and the display may be configured to display a corresponding number of target virtual images.

Figure 3:
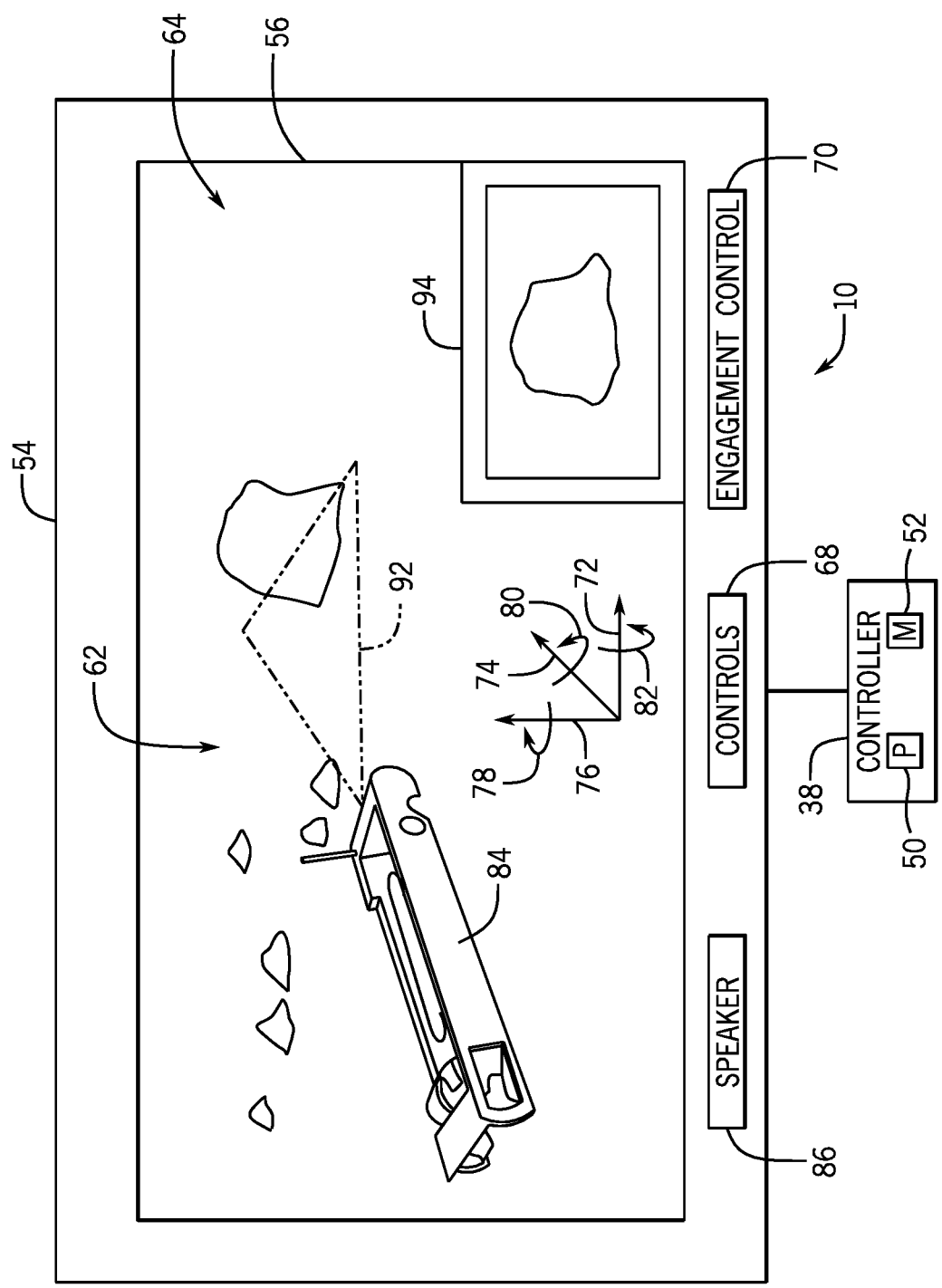
FIG. 3 is a schematic diagram of the controller and the user interface of FIG. 2.

FIG. 3 is a schematic diagram of the controller 38 (e.g., surface vessel controller) and the user interface 54 (e.g., surface vessel user interface) of FIG. 2. As illustrated, the visual representation 84 of the current virtual underwater vehicle is shown, and the visual representation of the target virtual underwater vehicle is not shown because the current virtual position is substantially equal to the target virtual position and the current virtual orientation is substantially equal to the target virtual orientation (e.g., due to the current physical position being substantially equal to the target physical position and the current physical orientation between substantially equal to the target physical orientation). In the illustrated embodiment, the controller 38 is configured to determine a field of view of one or more sensors of the underwater vehicle relative to the current virtual underwater vehicle. For example, the controller 38 may determine a field of view of the LIDAR system and/or a field of view of the camera relative to the current virtual underwater vehicle. Once each field of view is determined, the controller 38 may output a current field of view signal to the display 56 indicative of instructions to display a visual representation 92 of each field of view relative to the current virtual underwater vehicle. In response to receiving the current field of view signal, the display 56 may display the visual representation 92 of each field of view. In the illustrated embodiment, the controller 38 determines a field of view of the camera, and the display 56 displays the visual representation 92 of the field of view of the camera relative to the current virtual underwater vehicle. While the controller is configured to output the current field of view signal in the illustrated embodiment, in other embodiments, the controller may not output the current field of view signal.

In the illustrated embodiment, the controller 38 may receive a physical image signal from the underwater vehicle indicative of an image of the physical environment. In addition, the controller 38 may output a virtual image signal to the display 56 of the user interface 54 indicative of instructions to display the image 94 of the physical environment. In response to receiving the virtual image signal, the display 56 may display the image 94. The controller 38 may generate the image 94 based on feedback (e.g., which may be contained within the physical image signal) from a respective sensor of the underwater vehicle. The respective sensor may include the LIDAR system, the camera, or another suitable sensor (e.g., a radio detection and ranging (RADAR) system, a sonar system, an infrared camera system, etc.). While the controller is configured to instruct the display to display one image in the illustrated embodiment, in other embodiments, the controller may be configured to instruct the display to display more or fewer images (e.g., 0, 1, 2, 3, 4, or more), and the display may be configured to display a corresponding number of images. In certain embodiments, the controller 38 is configured to output the virtual image signal only in response to the underwater vehicle being positioned substantially at the target physical position and/or being oriented substantially at the target physical orientation. However, in other embodiments, the controller may receive the physical image signal at periodic intervals and output the virtual image signal at corresponding intervals. As used herein "substantially at" refers to a difference in position/orientation of less than a threshold value. For example, the threshold value for a position difference may be 5 meters, 3 meters, 100 cm, 50 cm, 25 cm, 10 cm, 5 cm, or 1 cm. In addition, the threshold value for an orientation difference may be 15 degrees, 10 degrees, 7 degrees, 5 degrees, 2 degrees, 1 degree, 0.5 degrees, or 0.25 degrees.

In certain embodiments, the operator may use the image 94 to verify that the underwater vehicle is located at a desired position and/or angled at a desired orientation. For example, in certain embodiments, the controller may instruct the display to present the image 94 and the target virtual image concurrently (e.g., adjacent to one another). In such embodiments, the operator may compare the images to determine whether the underwater vehicle is located at the desired position and/or angled at the desired orientation. Furthermore, in certain embodiments, the controller 38 may determine whether the underwater vehicle is positioned substantially at the target physical position and/or whether the underwater vehicle is orientated substantially at the target physical orientation based on the image of the physical environment (e.g., by comparing the image of the physical environment to the target virtual image). In addition, the controller 38 may output a position verification signal to the user interface indicative of instructions to provide an indication that the underwater vehicle is positioned substantially at the target physical position and/or that the underwater vehicle is orientated substantially at the target physical orientation. In response to receiving the position verification signal, the user interface 54 may emit an audible (e.g., via the speaker 86) and/or visual indication (e.g., via the display 56).

While controlling the underwater vehicle by controlling the target virtual underwater vehicle is disclosed herein, in certain embodiments, the underwater vehicle control system may also be configured to directly control the underwater vehicle (e.g., via engagement of a direct control mode of operation). In the embodiments disclosed above, a single controller (e.g., the surface vessel controller) is used to perform certain functions disclosed herein, including but not limited to generating the virtual environment, outputting the virtual environment signal, receiving the control input signal, outputting the target virtual underwater vehicle signal, outputting the target physical underwater vehicle signal, outputting the current virtual underwater vehicle signal, determining whether the current physical position is substantially equal to the target physical position, determining whether the current physical orientation is substantially equal to the target physical orientation, outputting the position match signal, receiving the physical image signal, and outputting the virtual image signal. However, in other embodiments, these functions, among others, may be performed by another suitable controller (e.g., the underwater vehicle controller, etc.) or a combination of controllers (e.g., the underwater vehicle controller and the surface vessel controller, etc.). Furthermore, while the vehicle control system is disclosed herein with regard to controlling underwater vehicles, the control system may be used to control other suitable types of vehicles.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An underwater vehicle control system of a surface vessel, comprising:
   at least one controller comprising a memory and a processor, wherein the at least one controller is configured to:
   generate, based on information from one or more sensors of the surface vessel, based on information from one or more sensors of an underwater vehicle, or based on information from both the one or more sensors of the surface vessel and the one or more sensors of the underwater vehicle, a virtual environment representative of the underwater vehicle in a physical environment, the virtual environment including a virtual representation of the underwater vehicle in a virtual representation of the physical environment;

output to a display of a user interface, a visual representation of the virtual environment;

receive, from a user, a plurality of control input signals navigating the virtual representation of the underwater vehicle in the virtual representation of the physical environment from a current virtual position and orientation to a target virtual position and orientation;

output to the display of the user interface, a visual simulation of movement of the virtual representation of the underwater vehicle in the virtual environment from the current virtual position and orientation to the target virtual position and orientation in real-time in response to the navigation from the user;

receive, from the user via the user interface, an engagement control activation;

output, in response to the engagement control activation, a target physical underwater vehicle signal to the underwater vehicle, the target physical underwater vehicle signal indicative of instructions to move the underwater vehicle to a target physical position and orientation corresponding to the target virtual position and orientation;

determine a current physical position and orientation of the underwater vehicle in the physical environment based on information from the one or more sensors of the surface vessel, based on information from the one or more sensors of the underwater vehicle, or based on information from both the one or more sensors of the surface vessel and the one or more sensors of the underwater vehicle;

determine the current physical position and orientation of the underwater vehicle is within a threshold distance of the target physical position and orientation; and output, to the display of the user interface, an indication that the current physical position and orientation of the underwater vehicle is within the threshold distance of the target physical position and orientation.

2. The underwater vehicle control system of claim 1, wherein the at least one controller is configured to instruct the display of the user interface to display the virtual representation of the underwater vehicle at the target virtual position and orientation in phantom lines, and the at least one controller is configured to instruct the display of the user interface to display the virtual representation of the underwater vehicle at the current virtual position and orientation in solid lines.

3. The underwater vehicle control system of claim 1, wherein the at least one controller is configured to:
receive a physical image signal from the underwater vehicle indicative of an image of the physical environment; and
output a virtual image signal to the display of the user interface indicative of instructions to display the image of the physical environment.

4. The underwater vehicle control system of claim 3, wherein the at least one controller is configured to output the virtual image signal only in response to the underwater vehicle being positioned substantially at the target physical position, and orientation.

5. The underwater vehicle control system of claim 1, wherein the at least one controller is configured to:
determine a field of view of the one or more sensors of the underwater vehicle; and
output, to the display of the user interface, a visual representation of a first field of view of the one or more sensors of the underwater vehicle at the current virtual position and a second field of view of the one or more sensors of the underwater vehicle at the target virtual position and orientation.

6. A method for controlling an underwater vehicle, the method comprising:
generating, via at least one controller having a memory and a processor of a surface vessel, based on information from one or more sensors of the surface vessel, based on information from one or more sensors of the underwater vehicle, or based on information from both the one or more sensors of the surface vessel and the one or more sensors of the underwater vehicle, a virtual environment representative of the underwater vehicle in a physical environment, the virtual environment including a virtual representation of the underwater vehicle in a virtual representation of the physical environment;

outputting, via the at least one controller to a display of a user interface, a visual representation of the virtual environment;

receiving, from a user via the at least one controller, a plurality of control input signals navigating the virtual representation of the underwater vehicle in the virtual representation of the physical environment from a current virtual position and orientation to a target virtual position and orientation;

outputting, via the at least one controller to the display of the user interface, a visual simulation of movement of the virtual representation of the underwater vehicle in the virtual environment from the current virtual position and orientation to the target virtual position and orientation in real-time in response to the navigation from the user;

receiving, from the user via the user interface, an engagement control activation;

outputting, via the at least one controller, in response to the engagement control activation, a target physical underwater vehicle signal to the underwater vehicle, the target physical underwater vehicle signal indicative of instructions to move the underwater vehicle to a target physical position and orientation corresponding to the target virtual position and orientation determining, via the at least one controller, a current physical position and orientation of the underwater vehicle in the physical environment based on information from the one or more sensors of the surface vessel, based on information from the one or more sensors of the underwater vehicle, or based on information from both the one or more sensors of the surface vessel and the one or more sensors of the underwater vehicle;

determining, via the at least one controller, the current physical position and orientation of the underwater vehicle is within a threshold distance of the target physical position and orientation; and outputting, via the at least one controller to the display of the user interface, an indication that the current physical position and orientation of the underwater vehicle is within the threshold distance of the target physical position and orientation.

7. The method of claim 6, further comprising:

receiving, via the at least one controller, a physical image signal from the underwater vehicle indicative of an image of the physical environment; and outputting, via the at least one controller, a virtual image signal to the display of the user interface indicative of instructions to display the image of the physical environment.

8. An underwater vehicle control system, comprising:

an underwater vehicle controller of an underwater vehicle, the underwater vehicle controller comprising a memory and a processor;

a user interface of a surface vessel, the user interface comprising a display; and a remote controller of the surface vessel, the remote controller comprising a memory and a processor, wherein the remote controller is communicatively coupled to the user interface and to the underwater vehicle controller, and the remote controller is configured to:

generate, based on information from one or more sensors of the surface vessel, based on information from one or more sensors of the underwater vehicle, or based on information from both the one or more sensors of the surface vessel and the one or more sensors of the underwater vehicle, a virtual environment representative of the underwater vehicle in a physical environment, the virtual environment including a virtual representation of the underwater vehicle in a virtual representation of the physical environment;

output to the display of the user interface, a visual representation of the virtual environment;

receive from a user a plurality of control input signals navigating the virtual representation of the underwater vehicle in the virtual representation of the physical environment from a current virtual position and orientation to a target virtual position and orientation;

output to the display of the user interface, a visual simulation of movement of the virtual representation of the underwater vehicle in the virtual environment from the current virtual position and orientation to the target virtual position and orientation in real-time in response to the navigation from the user;

receive, from the user via the user interface, an engagement control activation; and output, in response to the engagement control activation, a target physical underwater vehicle signal to the underwater vehicle, the target physical underwater vehicle signal indicative of instructions to move the underwater vehicle to a target physical position and orientation corresponding to the target virtual position and orientation;

wherein the underwater vehicle controller is configured to output a control signal to a propulsion system of the underwater vehicle indicative of instructions to move the underwater vehicle to the target physical position and orientation, and wherein the remote controller of the surface vessel is configured to:

determine a current physical position and orientation of the underwater vehicle in the physical environment based on information from the one or more sensors of the surface vessel, based on information from the one or more sensors of the underwater vehicle, or based on information from both the one or more sensors of the surface vessel and the one or more sensors of the underwater vehicle;

determine the current physical position and orientation of the underwater vehicle is within a threshold distance of the target physical position; and output to the display of the user interface, an indication that the current physical position and orientation of the underwater vehicle is within the threshold distance of the target physical position and orientation.

9. The underwater vehicle control system of claim 8, wherein the underwater vehicle controller is configured to output a physical image signal indicative of an image of the physical environment, wherein the remote controller is configured to receive the physical image signal, and wherein the remote controller is configured to output a virtual image signal to the display of the user interface indicative of instructions to display the image of the physical environment.

\* \* \* \* \*